US006668784B1

(12) United States Patent
Sellers et al.

(10) Patent No.: US 6,668,784 B1
(45) Date of Patent: Dec. 30, 2003

(54) THREADED INSERT FOR TAPERED SEAT SPARK PLUG BORES, INSTALLATION TOOLS, AND METHOD OF INSTALLATION

(76) Inventors: Gary Sellers, 226 Hay St., Rock Springs, WY (US) 82901-6632; Michael L. Shiffermiller, 410 Hutton St., Green River, WY (US) 82935-4903

( * ) Notice: Subject to any disclaimer, the term of this patent is extended or adjusted under 35 U.S.C. 154(b) by 0 days.

(21) Appl. No.: 10/301,272

(22) Filed: Nov. 20, 2002

(51) Int. Cl.[7] ................................................. B23P 7/00
(52) U.S. Cl. ............................ 123/193.5; 123/169 PA; 29/402.17; 411/178
(58) Field of Search ......................... 123/193.5, 169 PA; 29/402.17; 411/178

(56) References Cited

U.S. PATENT DOCUMENTS

| | | | |
|---|---|---|---|
| 3,694,838 A | * 10/1972 | Runton | 29/402.17 |
| 3,864,806 A | * 2/1975 | Hanson | 123/169 PA |
| 4,229,867 A | * 10/1980 | Spencer | 29/402.17 |
| 4,325,665 A | 4/1982 | Jukes | |
| 4,730,968 A | 3/1988 | Diperstein et al. | |
| 5,435,678 A | 7/1995 | Stencel | |
| 6,261,039 B1 | 7/2001 | Reed | |
| 6,382,893 B1 | 5/2002 | Reed | |
| 6,435,788 B2 | * 8/2002 | Reed | 411/178 |
| 6,439,817 B1 | * 8/2002 | Reed | 411/178 |
| 6,474,285 B2 | 11/2002 | Phillips | |

* cited by examiner

*Primary Examiner*—Marguerite McMahon
(74) *Attorney, Agent, or Firm*—Mallinckrodt & Mallinckrodt; Robert R. Mallinckrodt

(57) ABSTRACT

A thread insert and method to replace the damaged threads and tapered seat in a spark plug bore of an internal combustion engine allows for the continued use of the original factory specified spark plugs where the original threads in the spark plug bore have been damaged by stripping or cross threading. The thread insert's inner bore is designed to replace the original threads and tapered seat in the cylinder head. The thread insert may be adapted to fit any internal combustion engine using tapered seat spark plugs, and is particularly useful in deep spark plug bores with limited access as found in the aluminum heads in Ford modular engines. The insert includes a flange head that determines how far into the head the insert can extend and a recess below the flange to collect any bonding agent that may be squeezed from the threads during installation of the insert. Special tools make the installation of the insert easy and accurate.

19 Claims, 10 Drawing Sheets

Figures 1, 2:
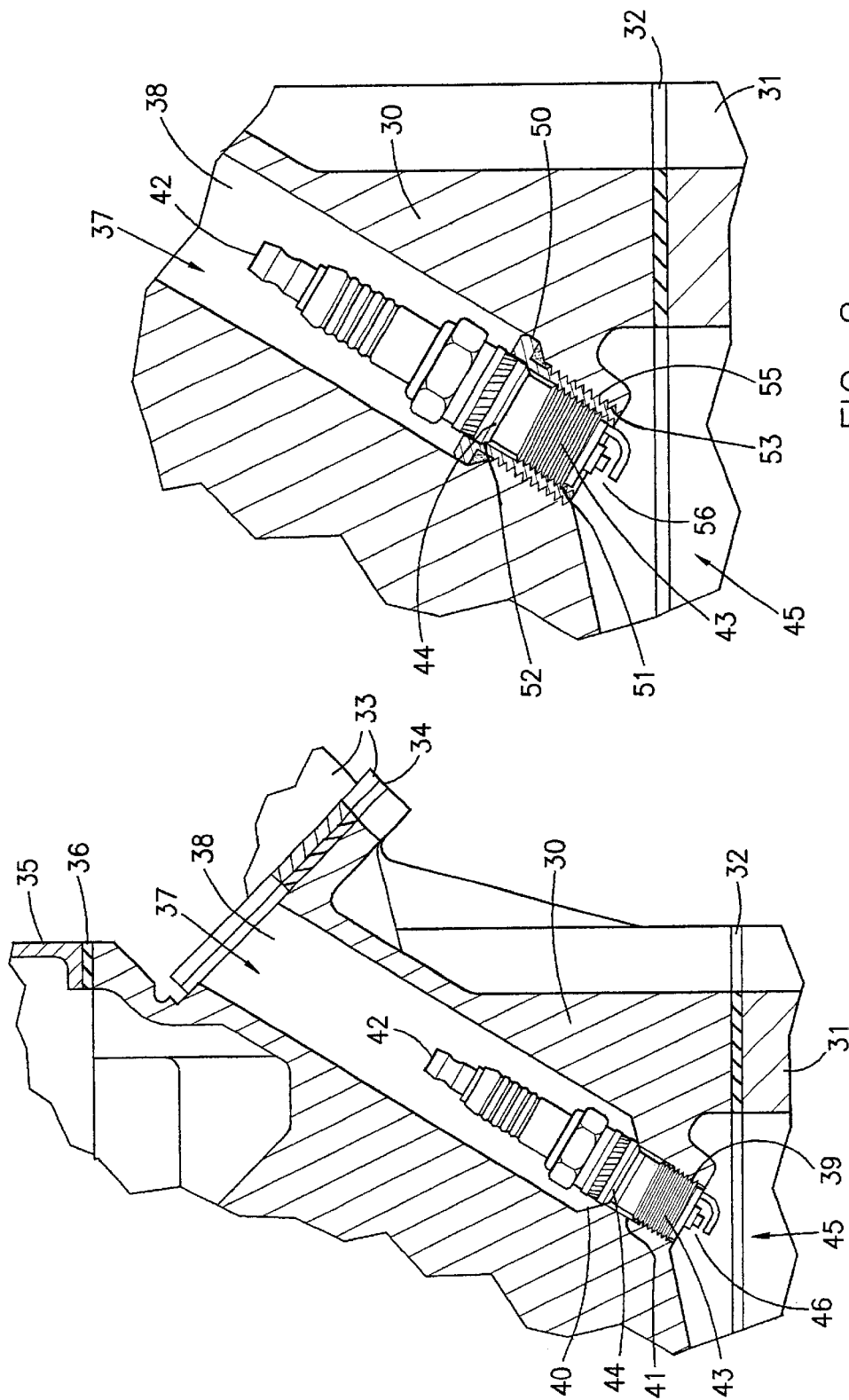

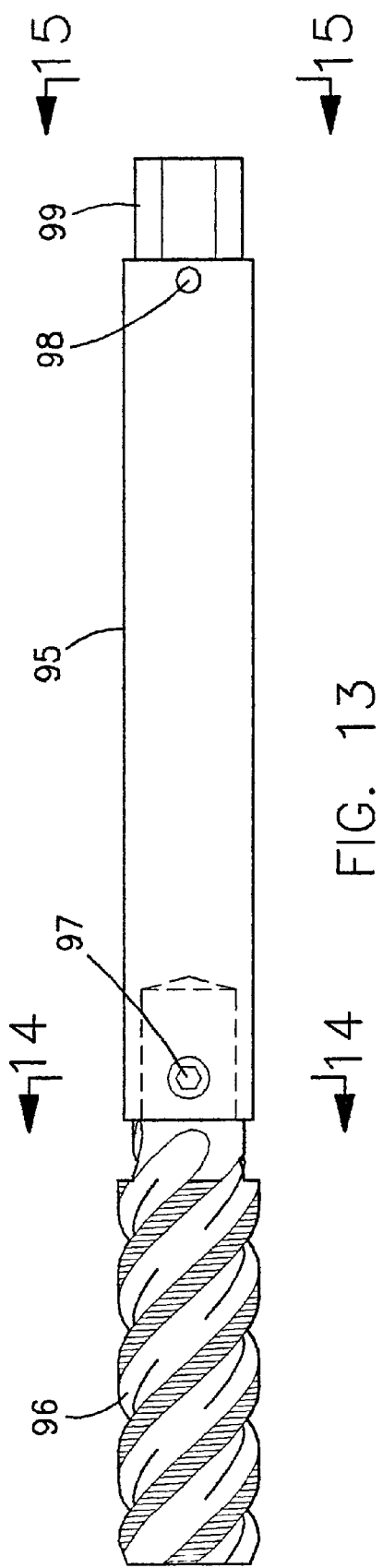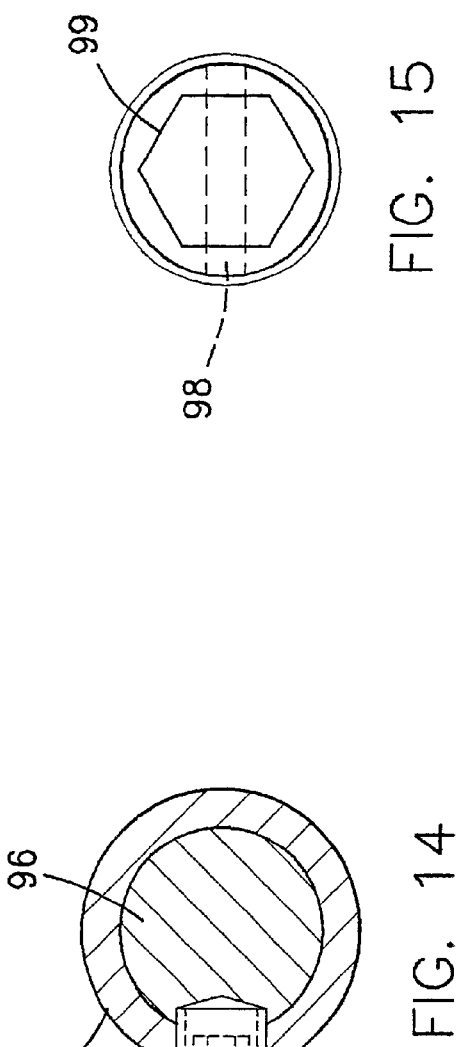
FIG. 13
FIG. 14
FIG. 15

THREADED INSERT FOR TAPERED SEAT SPARK PLUG BORES, INSTALLATION TOOLS, AND METHOD OF INSTALLATION

BACKGROUND OF THE INVENTION

1. Field

This invention relates to devices and methods for replacing damaged spark plug bores in internal combustion engines, and in particular, to permanently installed thread inserts and methods for installing the thread inserts.

2. State of the Art

The threads of a spark plug bore in a cylinder head can be damaged if the spark plug is over torqued or misaligned during installation or is not tightened sufficiently during installation allowing the spark plug to loosen during use. The threads are either stripped entirely or become cross threaded. This problem is compounded by the modern trend to construct cylinder heads from aluminum, a relatively soft metal, and from the reduction of the number of threads in spark plug bores. This is a particular problem with aluminum heads used in Ford engines, particularly the modular engines such as the V-10 5.4 and 4.6 models. The spark plug bores in these engines have only about four full threads.

Damaged threads are particularly troublesome if the spark plug bore is designed for a tapered seat spark plug as in the indicated Ford engines, in lieu of the traditional gasket seat spark plug. Tapered seat spark plugs require that the spark plug bore have a special tapered seat in and as part of the bore whereby an air tight seal is formed between the spark plug and the cylinder head. When the threads are damaged, the tapered seat spark plug may not sit properly in the bore which prevents the air tight seal from forming. A faulty airtight seal can cause a loss of combustion pressure in the engine. A faulty airtight seal can also allow carbon tracking, the build up of conductive carbon residue on the wall of the spark plug bore orifice caused by the escaping gases. Carbon tracking can cause the spark plug or spark plug wire to short out leading to either no spark or a weakened spark in the cylinder. Both the loss of combustion pressure and carbon tracking results in unsatisfactory engine performance.

One current repair method, and the method currently recommended by Ford for the indicated engines, consists of replacing the cylinder head having the damaged spark plug bore with a new cylinder head. This is extremely costly to a consumer because the cylinder heads are expensive to purchase and difficult and expensive to replace.

A cheaper repair method currently in use for some engines where the threads of the spark plug bore are easily accessible and which is well known in the art consists of installing commercially available thread repair inserts, such as a helical insert. These types of inserts require that the damaged bore be drilled out to a larger diameter and re-threaded with a commercially available tap. The insert is then threaded into the bore using the newly tapped threads. The threaded inner bore of the insert then serves as the new threads for the spark plug. However, the prior art thread inserts do not replace the tapered seat. This is important because drilling and tapping a tapered seat spark plug bore destroys the tapered seat in the bore. The original tapered seat plug cannot be used and must now be replaced with a gasket seat spark plug.

This leads to two complications. First, the non-original type spark plug can lead to inferior engine performance. This is due to the fact that the non-original type plug may not have the same characteristics as the original plug. For example, the non-original type plug may have a shorter or longer reach than the original plug. A longer reach spark plug could cause spark knock along with residue filled threads which can cause difficulties in spark plug removal. This also can possibly damage the piston as well. A shorter reach spark plug causes the thread insert's threads to fill with residue allowing the spark plug to easily foul and misfire. The other complication is that the consumer could become confused from having a mismatched set of spark plugs leading to the installation of a plug that could cause engine damage.

The problems are compounded with the Ford engines mentioned because the spark plug bores are extremely deep so the spark plug is installed in the lower portion of the bore and is completely within the bore and only accessible from the top opening of the bore. This means that the damaged threads will be at the bottom end of the bore and very difficult to get to. This makes successful installation of a prior art thread insert very difficult. This leads to Ford's recommendation of replacement of the cylinder head to repair damaged threads in the spark plug bore.

Accordingly, there has existed a need for a thread insert that can replace both the threads and tapered seat in a damaged spark plug bore, which is relatively simple and easy to install, and that will allow the use of the original, factory specified spark plug after the repair is complete. This is particularly needed in the aforementioned Ford engines where the threads are located at the bottom of a very deep spark plug bore so are very difficult to access.

SUMMARY OF THE INVENTION

According to the invention, a thread insert is provided that replaces both the threads and tapered seat of a damaged tapered seat spark plug bore. Unlike prior art thread replacement devices and methods, the thread insert and method of the present invention allows the repair of a damaged tapered seat spark plug bore in deep spark plug bores without the needless expense and headache of removing and replacing the cylinder head or the use of an insert, such as a "helicoil" helical insert, that does not allow the use of the original type of spark plugs. The thread insert allows the spark plug to be positioned in the spark plug bore to extend to substantially the same depth in the cylinder as it would have in the original bore thus eliminating the debilitating effects of over or under reach spark plugs. Further, a damaged spark plug bore in an aluminum cylinder head repaired with the thread insert is superior to the stock head configuration because the thread insert is much less susceptible to damage from cross threading or stripping since it is made from a harder metal than aluminum, such as steel or a steel alloy.

The thread insert of the invention has an exterior threaded shaft extending from a flanged head to a distal end. A non-threaded and recessed neck is preferably interposed between the exterior threaded shaft and the flanged head. The recessed, non-threaded neck area serves as a collector for excess bonding agent, such as J-B Qwik Weld, which can be applied to the exterior threads of the insert during installation to bond the insert to the cylinder head. This securely holds the insert in place to allow a spark plug to be removed from the insert while the insert remains in the cylinder head. It also helps form an airtight seal between the thread insert and cylinder head. The flanged insert head positions the insert in the cylinder head and prevents the thread insert from being threaded too far into the cylinder, which could cause damage to the piston or unsatisfactory spark plug performance.

The thread insert has an inner bore configured to reproduce the undamaged tapered seat spark plug bore. In particular, the inner bore has a threaded portion toward the distal end to receive the threaded end of the spark plug. A non-threaded portion in the inner bore is disposed above the threaded portion of the inner bore and the top of the thread insert and includes a taper formed in the insert to mate and seal with the tapered seat of the spark plug. The non-threaded portion and taper is contoured to the same specifications as the original undamaged spark plug bore. Thus, the non-threaded portion and taper forms a new tapered seat whereby an airtight seal is created with the spark plug such that it is able to withstand the high pressures of an internal combustion engine. Further, the dimensions of the thread insert are such that when installed into the cylinder head, the spark plug inserted into the thread insert is at substantially the same depth in the cylinder as it would have been in the undamaged bore.

The thread insert may be formed of various materials, preferably a material harder than aluminum, such as steel or a steel alloy, which will better resist thread damage than aluminum. The thread insert may be adapted to conform to different engine designs. In adapting the thread insert, the length of the exterior threaded shaft must be such that it does not extend into the cylinder when inserted. Also, the shape of the inner bore is easily determined since it is governed by the specifications of the tapered seat spark plug recommended by the engine manufacturer.

The method of installing the thread insert requires that the damaged spark plug bore be drilled and tapped as is well known in the art. The only special consideration is the use of guide pilots to ensure correct alignment in the cylinder head and that the piston head is not damaged. The guide pilots are specifically adapted for each type of engine. The exterior of the guide pilot is cylindrical in nature with the lower portion having a slightly smaller diameter than that of the upper portion. The lower portion of the guide pilot has a smaller diameter in order for it to snugly slide into the upper portion of the spark plug bore. The upper portion of the guide pilot, also being of cylindrical shape but having a larger diameter than the lower portion, has one side flattened. The flattened side abuts against the cylinder head such that the guide pilot is properly aligned over the spark plug bore. The flattened side also prevents the guide pilot from spinning during drilling or tapping.

The guide pilot has a smooth inner bore having a diameter just larger than that of a drill bit or tap of a particular size, allowing the bit or tap to slide through but preventing them from becoming misaligned. The drill bits and taps can be further adapted for use with the guide pilots by installing a stop pin or other similar device onto their shafts. The stop pin prevents the bit or tap from damaging the piston by stopping the bit or tap before entering the cylinder too deeply.

The thread insert can be included in a kit of interrelated parts, which includes: guide pilots, drill bits and taps adapted to be used with the guide pilots, and a bonding agent.

THE DRAWINGS

Figure 3:
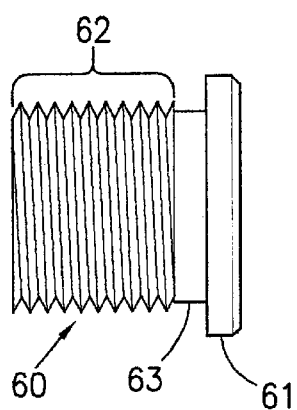
Figure 4:
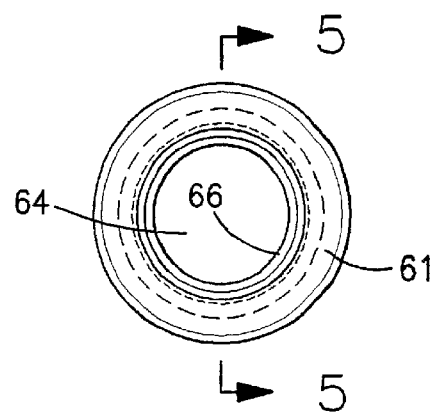
Figure 7:
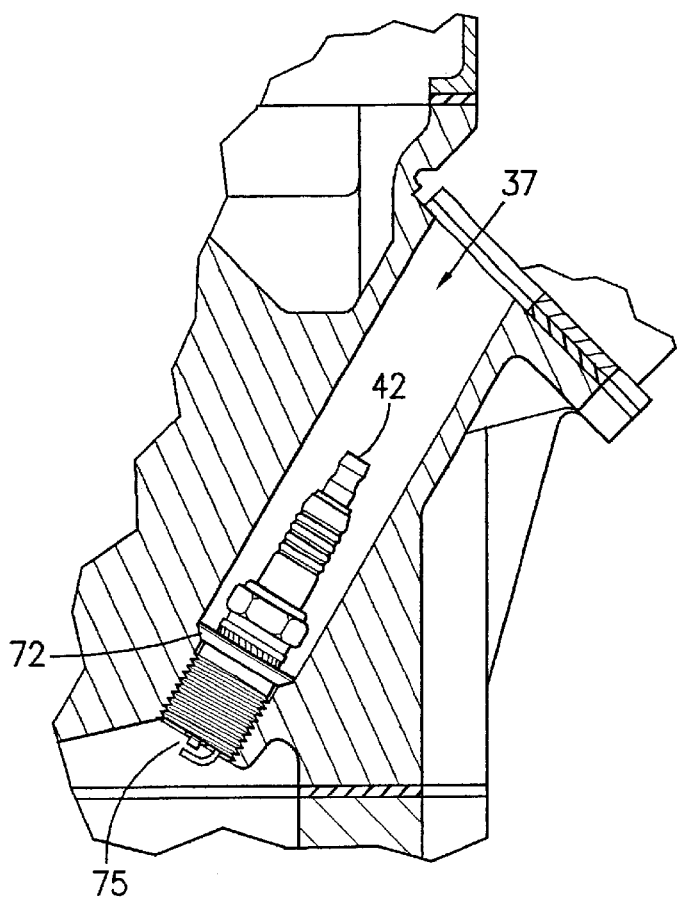
Figure 5:
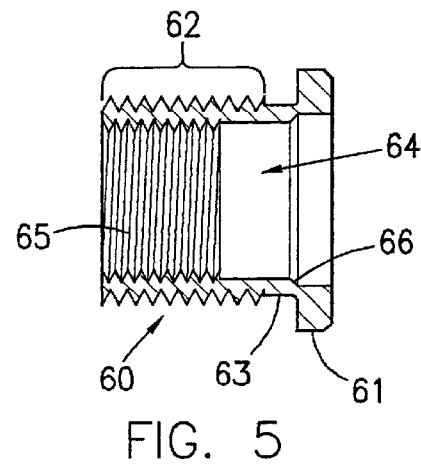
Figure 6:
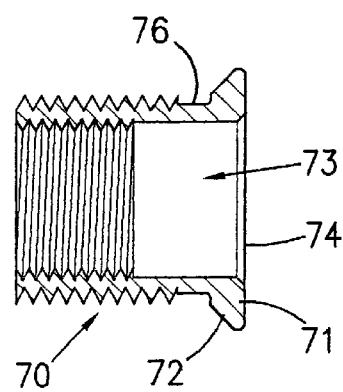
Figure 8:
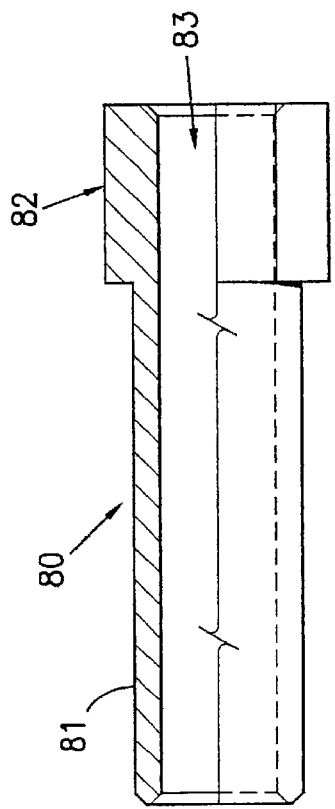
Figure 9:
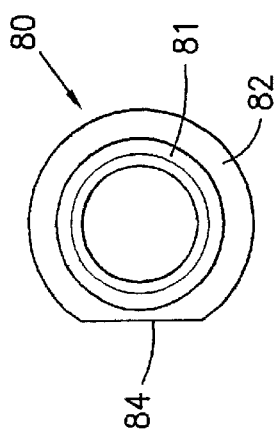
Figure 12:
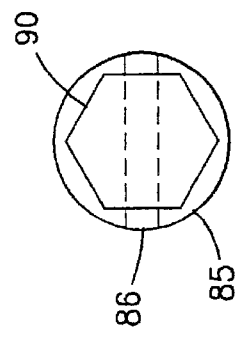
Figure 11:
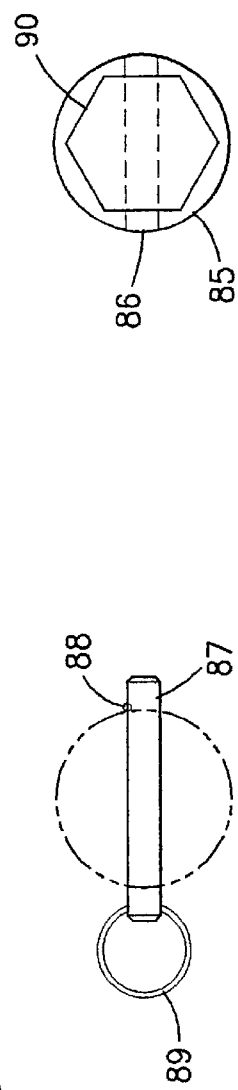
Figure 10:
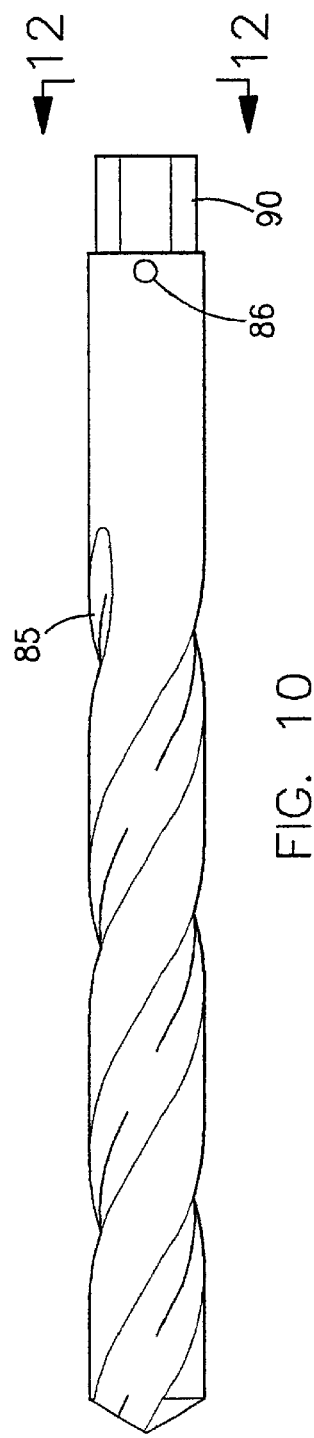
Figure 16:
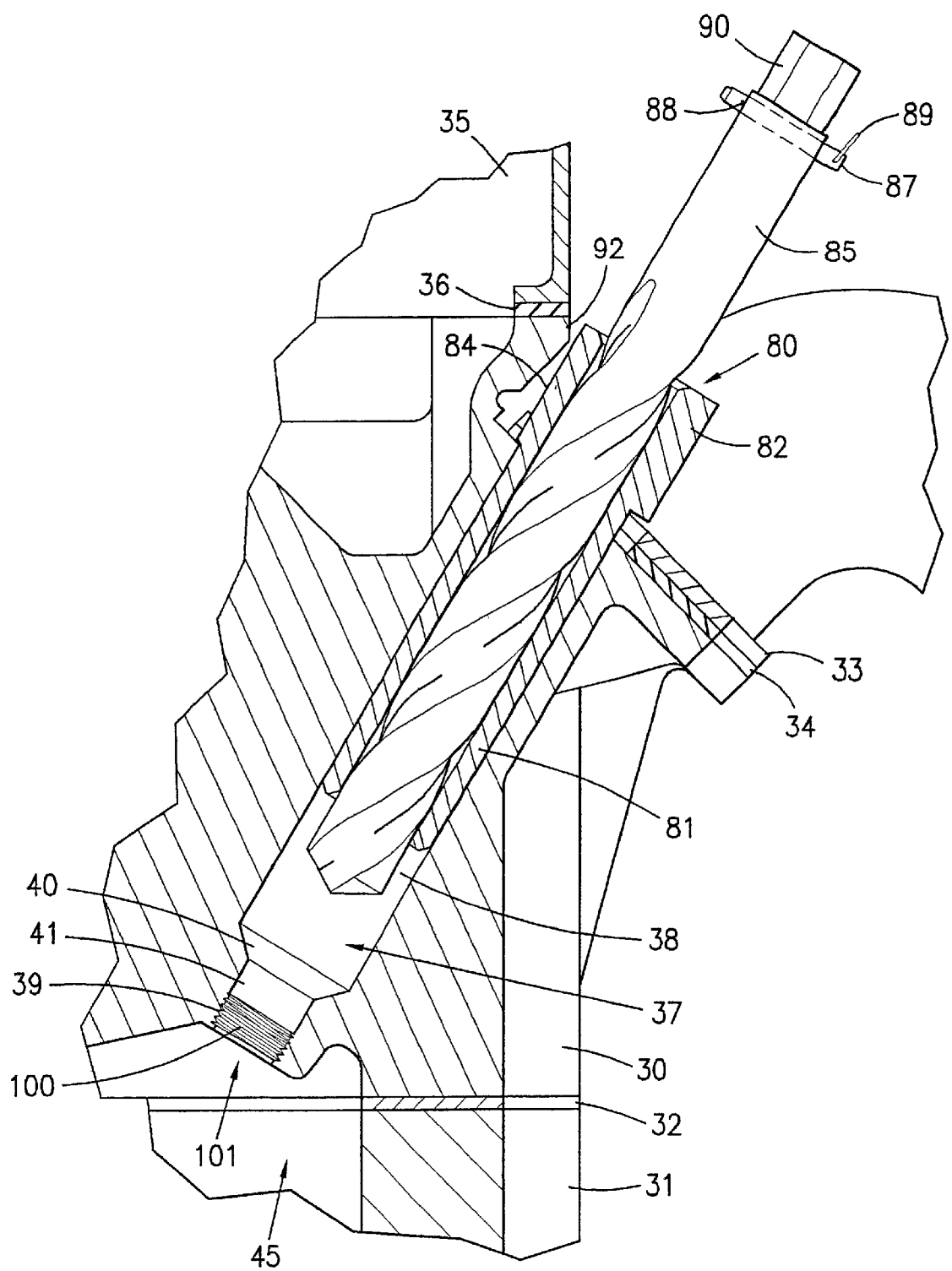
Figure 17:
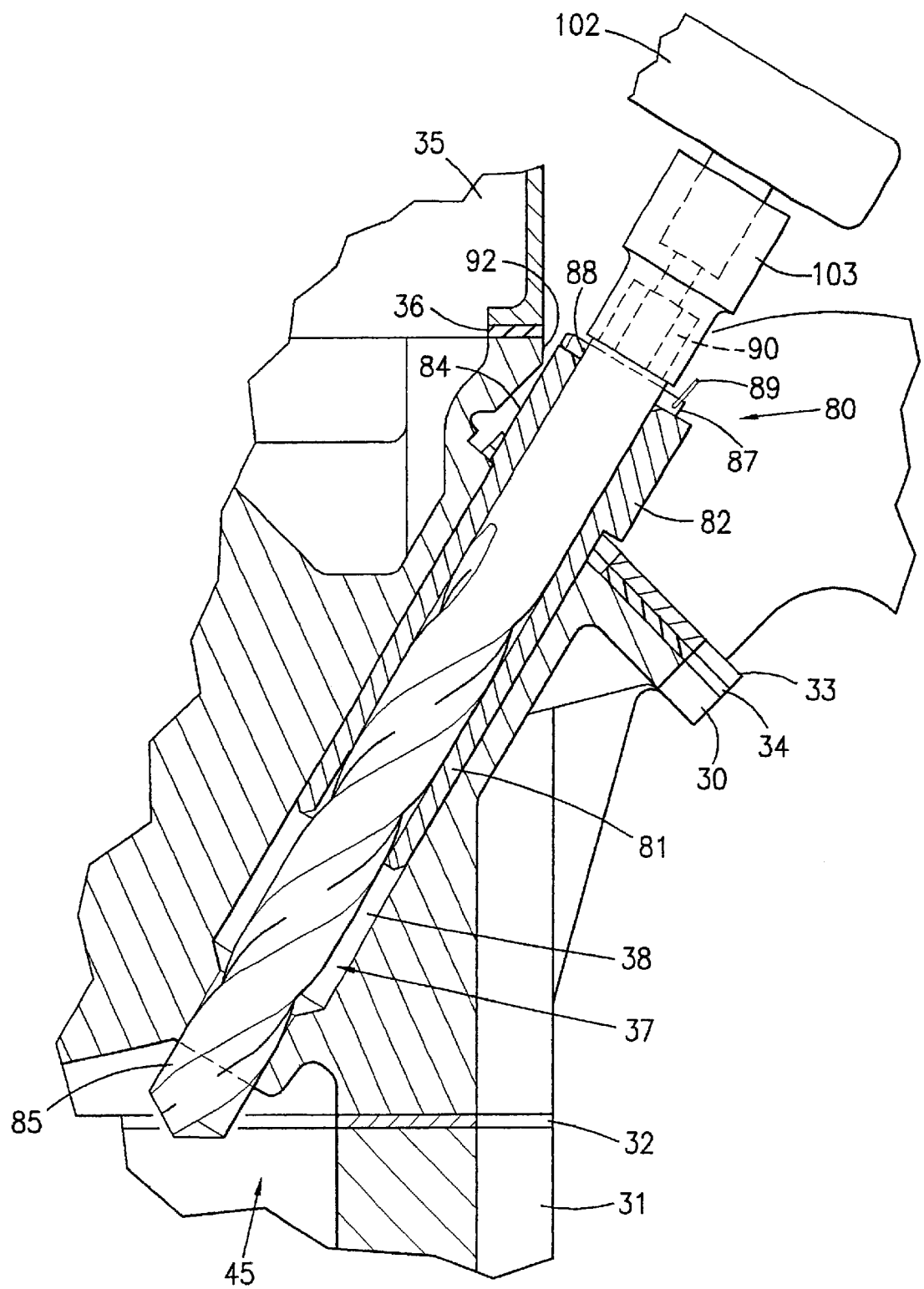
Figure 18:
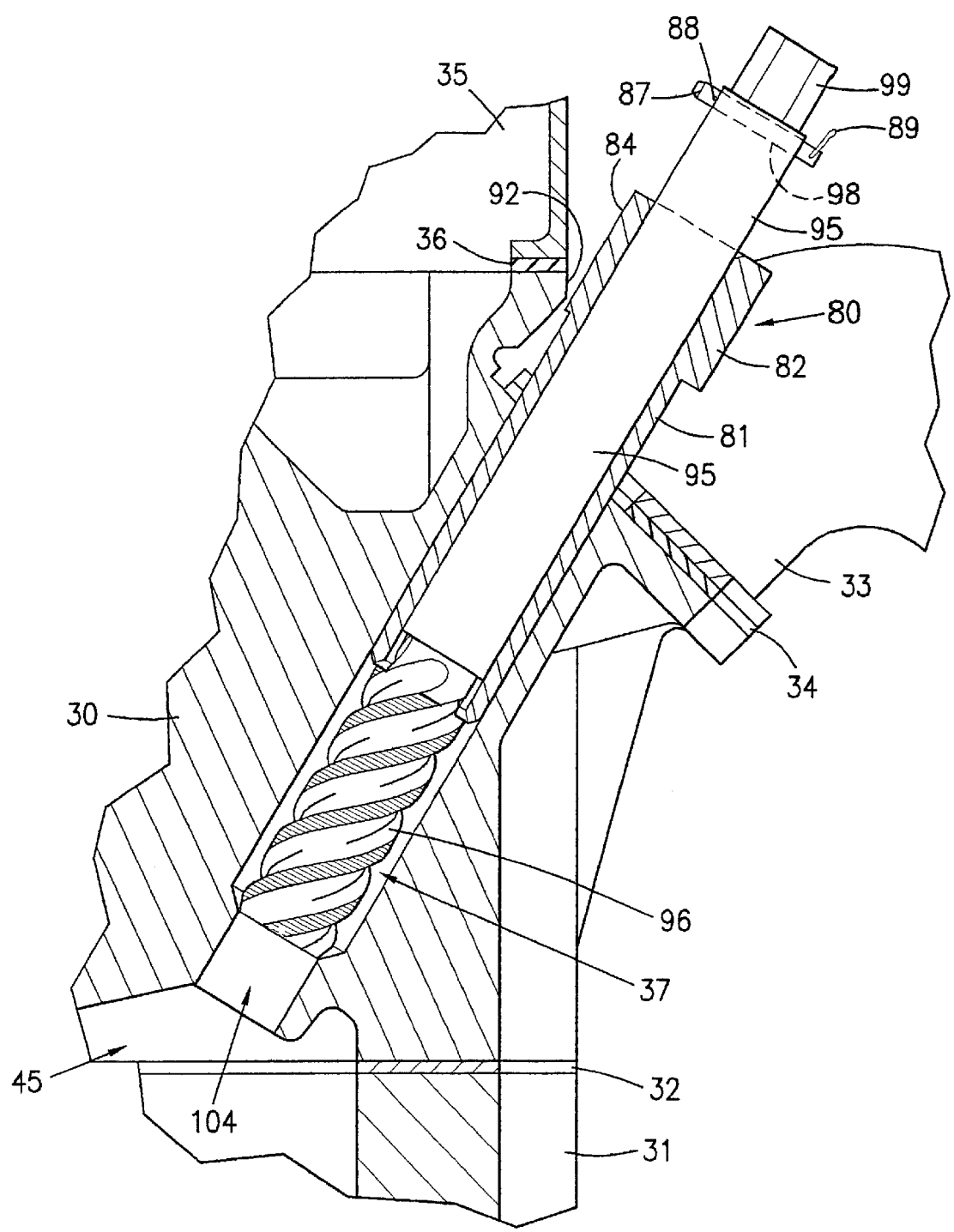
Figure 19:
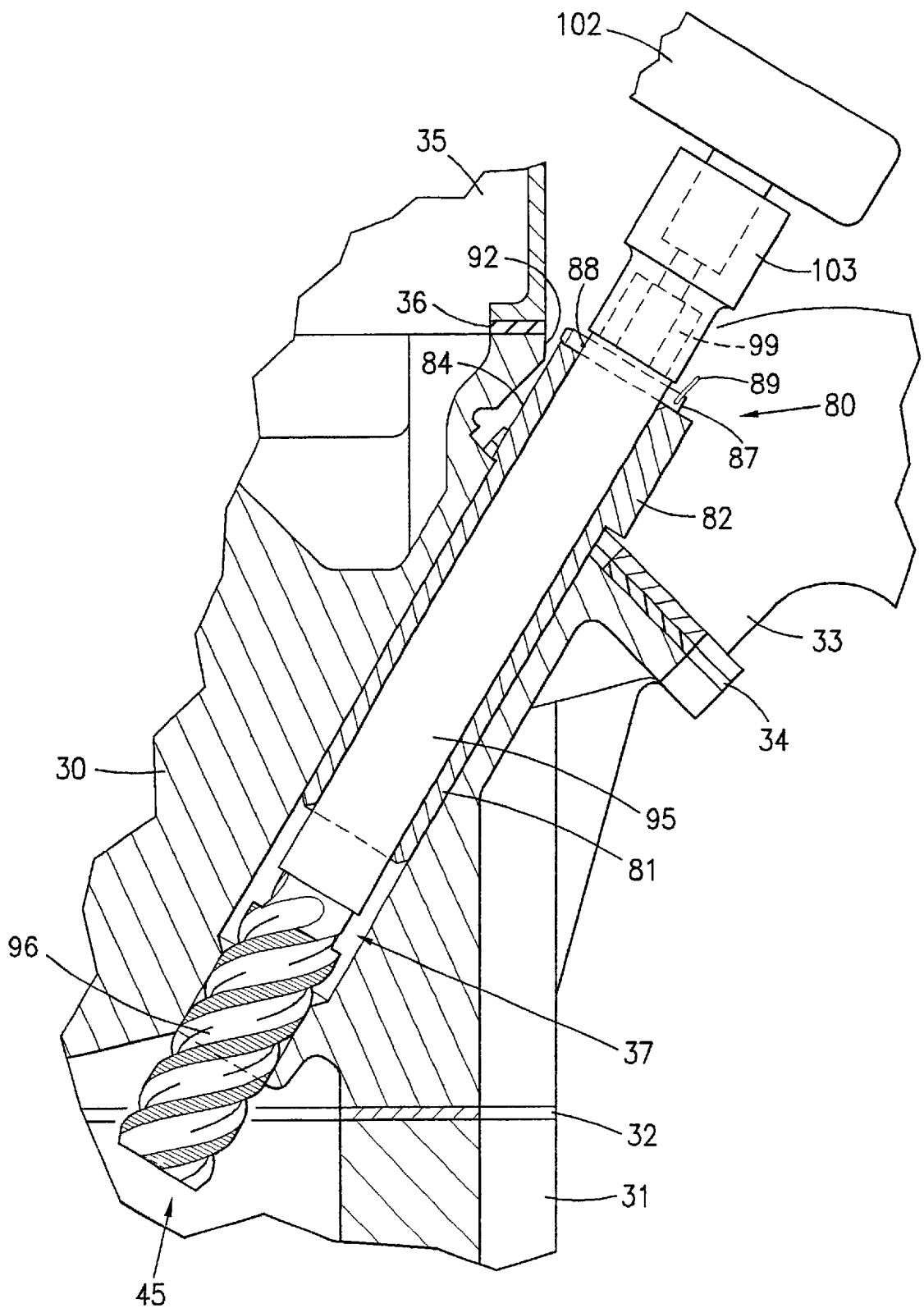
Figure 20:
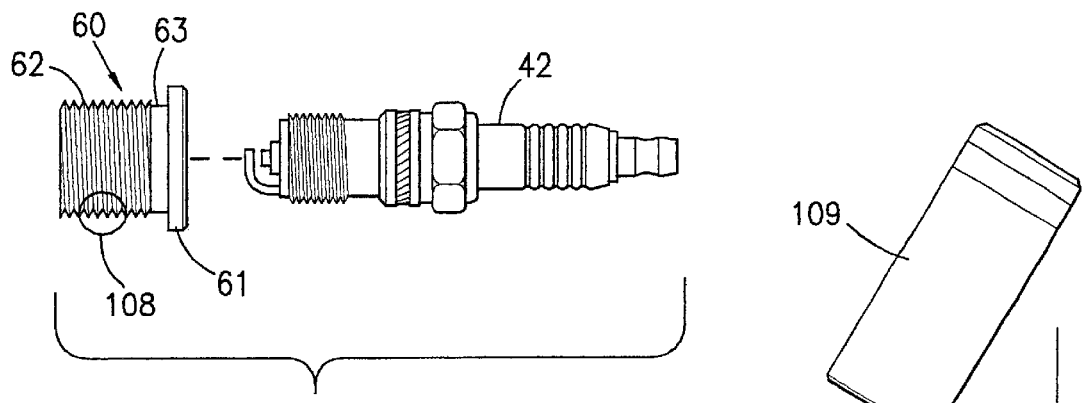
Figure 21:
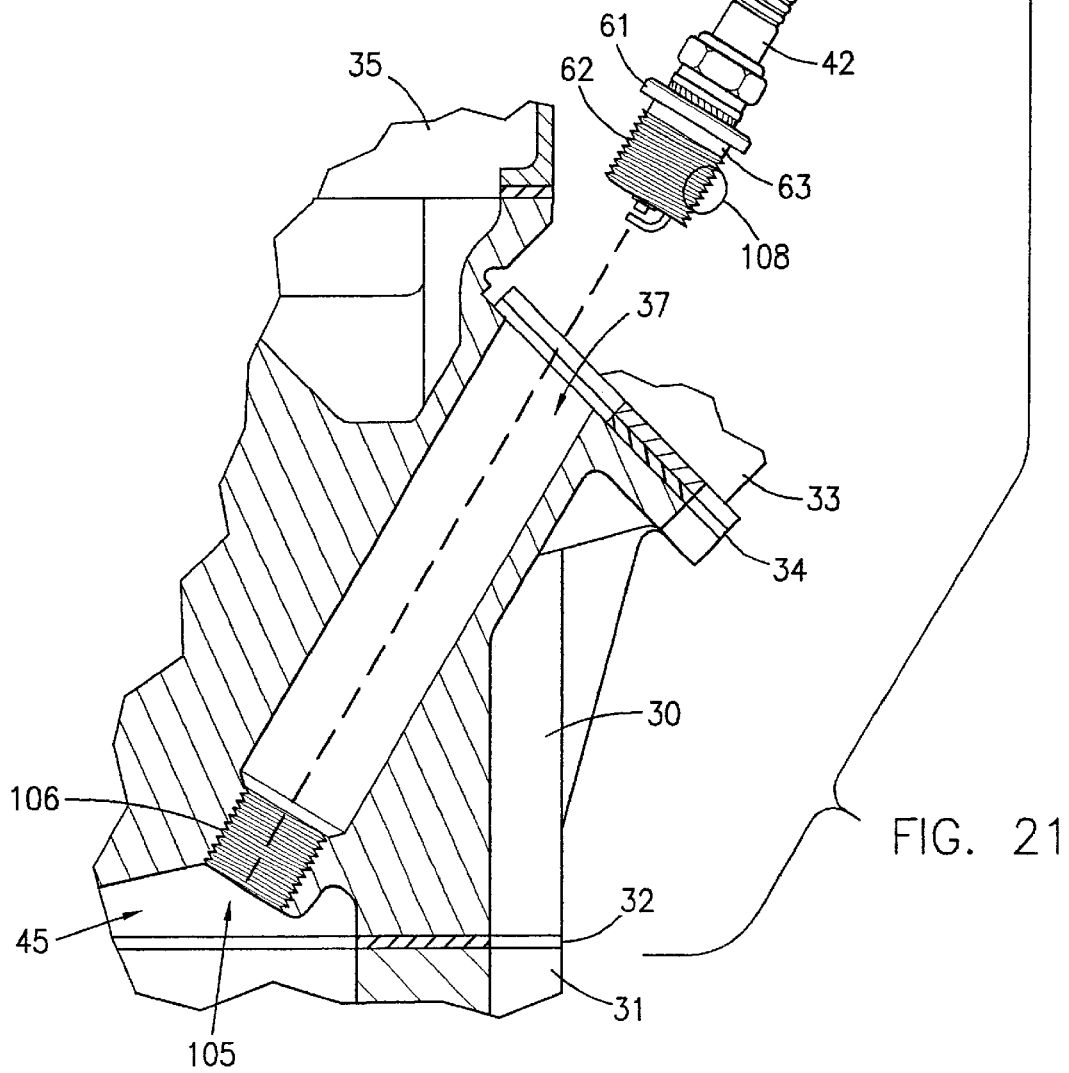
Figure 22:
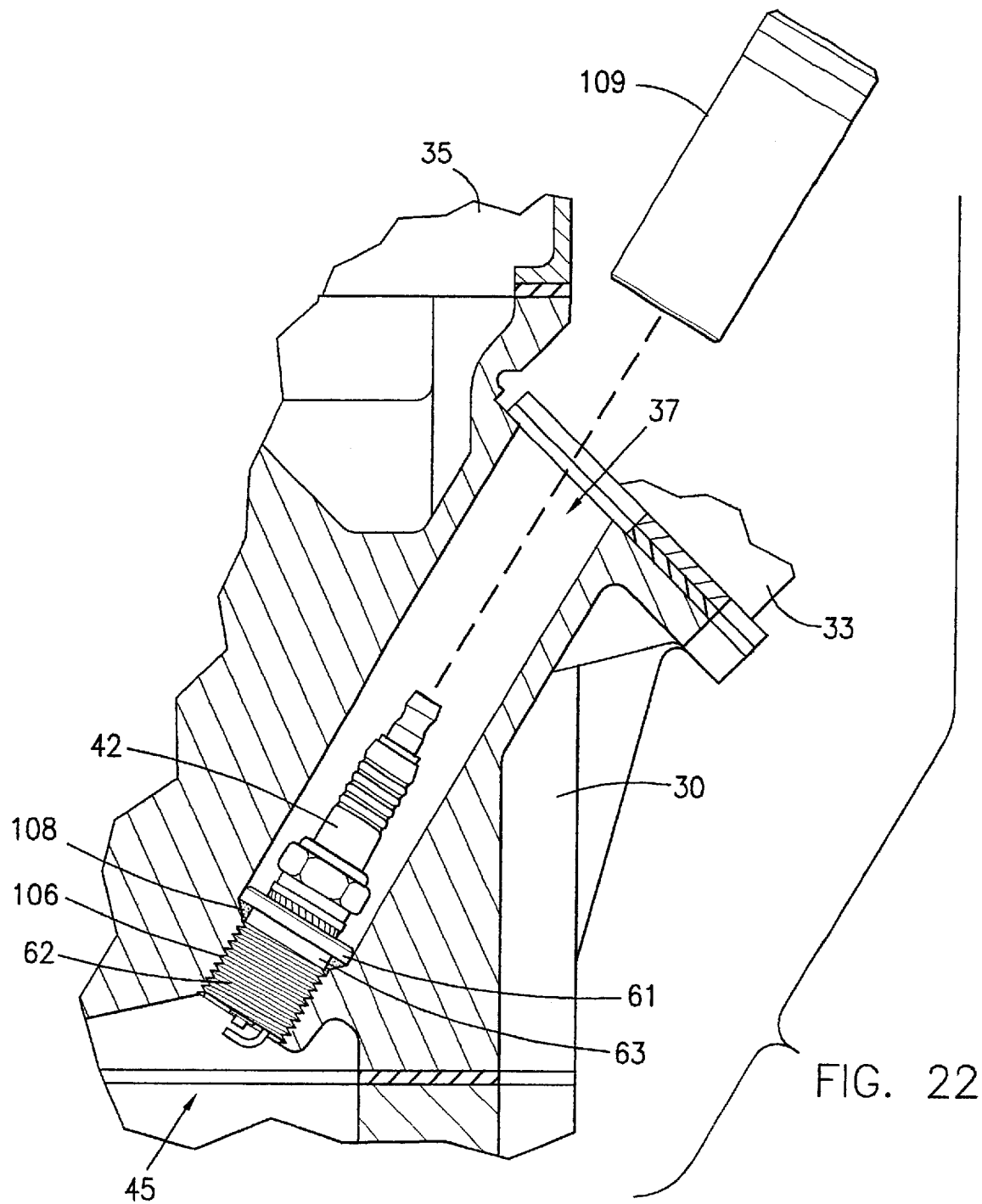

In the accompanying drawings, which represent the best mode presently contemplated for carrying out the invention:

FIG. 1 is a fragmentary vertical section through a spark plug bore of a cylinder head of an internal combustion engine showing a spark plug installed therein;

FIG. 2, a fragmentary vertical section similar to that of FIG. 1, showing a thread insert of the invention installed in the spark plug bore;

FIG. 3, a side elevation of a thread insert of the invention;

FIG. 4, a top plan view of the thread insert of FIG. 3;

FIG. 5, a vertical section taken on the line 5—5 of FIG. 3;

FIG. 6, a vertical section similar to that of FIG. 5, but showing an alternate embodiment of the thread insert with the flanged head having a chamfered bottom;

FIG. 7, a fragmentary vertical section similar to that of FIG. 2, but showing the alternate thread insert of FIG. 6 installed in the spark plug bore;

FIG. 8, a side elevation, partially in section, of a guide pilot used during installation of the thread insert of the invention and part of the kit of tools of the invention;

FIG. 9, a top plan view of the guide pilot, taken from the right side of FIG. 8;

FIG. 10, a side elevation of a drill bit used during installation of the thread insert of the invention and included as part of the kit of tools;

FIG. 11, a top plan view of a stop pin included as part of the kit of tools;

FIG. 12, a top plan view of the drill bit taken from the right side of FIG. 10;

FIG. 13, a side elevation of a tap used during installation of the thread insert of the invention and included as part of the kit of tools;

FIG. 14, a vertical section taken on the line 14—14 of FIG. 13;

FIG. 15, a top plan view of the tap taken from the right side of FIG. 13;

FIG. 16, a fragmentary vertical section similar to that of FIG. 1 showing the spark plug bore without a spark plug therein, but with the drill and guide pilot of the invention in place ready to drill out the damaged threads in lower portion of the bore;

FIG. 17, a fragmentary vertical section similar to that of FIG. 16 showing the position of the drill bit after drilling;

FIG. 18, a fragmentary vertical section similar to that of FIG. 16 showing the tap and guide pilot of the invention in place ready to tap new threads into in lower portion of the bore;

FIG. 19, a fragmentary vertical section similar to that of FIG. 18 showing the position of the tap after tapping;

FIG. 20, a side elevation of a thread insert of the invention and a spark plug ready to be screwed into the thread insert;

FIG. 21, a fragmentary vertical section similar to that of FIG. 2 showing the spark plug bore without a spark plug therein but with the newly tapped threads in the lower portion thereof, and with the spark plug in the thread insert of the invention and in position to be inserted into the bore and screwed into the threads in the lower portion of the bore; and FIG. 22, a fragmentary vertical section similar to that of FIG. 21 showing the spark plug installed in the spark plug bore.

DETAILED DESCRIPTION OF THE ILLUSTRATED EMBODIMENTS

FIG. 1 shows a cylinder head 30 mounted on engine block 31 with head gasket 32 creating an air tight seal between the two. Exhaust manifold 33 is mounted on cylinder head 30 with manifold gasket 34 therebetween, and valve cover 35 is mounted on cylinder head 30 with cover gasket 36 therebetween. A deep spark plug bore 37 in cylinder head 30 has an upper portion 38 and a lower threaded portion 39. A taper 40 separates the upper portion 38 from a lower non-threaded portion 41 which extends from taper 40 to lower threaded portion 39. A tapered seat spark plug 42 includes a threaded portion 43 screwed into bore lower threaded portion 39 so that spark plug tapered seat 44 seals against bore taper 40. When spark plug 42 is installed, the lower electrode end of spark plug 42 extends into the cylinder 45 a distance 46. This arrangement with the deep spark plug bore 37 so that the spark plug 42 is installed completely within the bore 37 and does not extend above the cylinder head 30 is unusual, but is typical of the Ford modular engines mentioned using aluminum cylinder heads such as the V-10 5.4 and 4.6 models.

As shown, spark plug 42 and the lower threaded portion 39 of the spark plug bore 37 are deeply recessed which makes access to the lower portions 39 and 41 of the spark plug bore 37 very difficult. The Ford engines mentioned have only about four full threads in lower threaded portion 39. The combination of making the cylinder head of aluminum, a relatively soft metal which more easily allows damage to the threads than steel or steel alloy previously used, with the use of only about four threads, make this engine particularly susceptible to damage to cylinder head threads 39. This damage can occur when changing the spark plug 42 such as by cross threading the replacement spark plug or over tightening the spark plug, or, during operation of the engine, if the spark plug is not tightened enough. In such case, the spark plug can vibrate loose during engine operation and the increased vibration when loose can damage the threads, and, in some instances, damage the threads to the extent that the spark plug will blow out of the bore striping the threads. When head thread damage occurs, such as stripped threads or cross threaded threads, the spark plug 42 can no longer be threaded into and securely held in bore 37. Current practice when thread damage occurs with such engines is to replace the cylinder head to great expense to the owner.

FIG. 2, is similar to FIG. 1, but shows the threads of the spark plug bore repaired in accordance with the invention. Thus, a thread insert 50 of the invention is shown forming a lower threaded portion 51 to receive the threaded portion 43 of spark plug 42. The spark plug 42 is screwed into lower threaded portion 51 with tapered seat 44 sealing against insert taper 52. Thread insert 50 has external threads 53 which are screwed into and secured in threads 55 formed in the lower portion of the spark plug bore 37 by the process of the invention. In order to accommodate thread insert 50, the lower portion of spark plug bore 37 is drilled to a larger diameter bore than initially provided and is tapped to provide the threads 55. The lower electrode end of spark plug 42 extends into cylinder 45 a distance 56. The distance 56 when using the thread insert should be about the same as the distance 46 provided by the original spark plug bore in the cylinder head.

A preferred embodiment of the thread insert of the invention is shown in FIGS. 3, 4, and 5. This corresponds to the insert 50 shown installed in FIG. 2. The thread insert 60, has a flanged head 61 and a set of exterior threads 62, corresponding to threads 55 in FIG. 2. The exterior threads 62 are designed to engage threads tapped into the lower portion of the spark plug bore as at 53, FIG. 2. Interposed between the flanged head 61 and the exterior threads 62, is a neck 63. The neck 63 is unthreaded and recessed by having a diameter about equal to the bottom of the exterior threads 62. A deeper recess can be provided if desired. The thread insert 60 has an inner bore 64 extending along the longitudinal axis. The inner bore 64 has an inner threaded portion 65, corresponding to threads 51, FIG. 2, at its lower portion designed to receive the threaded end of a spark plug. The inner bore 64 has an insert taper 66, corresponding to insert taper 52, FIG. 2, disposed above the inner threaded portion 65. The insert taper 66 is designed to receive the tapered seat of a spark plug to form an airtight seal between the spark plug and thread insert 60. The insert taper 66 is positioned in inner bore 64 so that when insert 60 is installed in a spark plug bore, insert taper 66 is positioned at about the same position along the bore as the bore taper 40 in FIG. 1 so that the spark plug will terminate at about the same position in the cylinder as it would have without the insert.

FIGS. 6 and 7 show an alternate embodiment of the thread insert. In this embodiment, the flanged head 70 of thread insert 71 has a chamferred lower edge 72. The chamferred lower edge 72 allows for a tight fit with the remaining portion of bore taper 40, FIG. 7, after enlargement and tapping of the spark plug bore 37 to receive the thread insert. The chamfer of edge 25 should match the angle of bore taper 40, which will typically be about forty-five degree. As seen in FIG. 7, the chamfer 72 allows the thread insert 71 to fit closer to the bottom of the spark plug bore 37 so that the top of the inner bore 73 can be tapered as at 74 to form the taper against which spark plug tapered seat 44 will seal. This positioning of the thread insert 71 and the taper 74 again results in a spark plug extension 75 into cylinder 45, FIG. 7, about equal to the original extension 46, FIG. 1. Thread insert 71 preferably also includes neck 76.

It should be realized that an important feature of the invention is to provide a repaired spark plug bore having a tapered seat configured similarly to the original bore to operatively and sealingly accept the same spark plugs as originally used and as used in all undamaged spark plug bores, and to provide about the same spark plug extension into the cylinder of the engine as originally provided. This ensures optimum operation and performance of the engine.

In addition to the thread insert, the invention also provides a kit of tools for use in installing the thread insert of the invention and a method of installing the thread insert of the invention using such tools. FIG. 8 and 9 show a guide pilot 80. The guide pilot 80 is cylindrical in shape having a lower portion 81 and an upper portion 82. The lower portion 81 should have a diameter allowing it to snugly slide part of the way down the upper portion 38 of spark plug bore 37, FIGS. 16–19. This snug fit in the spark plug bore ensures an accurate repeatable alignment of the guide pilot in the spark plug bore. The upper portion 82 of the guide pilot should have sufficient diameter to prevent it from entering the spark plug bore 37. The guide pilot 80 has a smooth inner bore 83 extending along its longitudinal axis. One side of the upper portion 82 has a flattened portion 84, FIG. 9. The flattened portion 84 is designed to assist with alignment of the guide pilot 80 in the spark plug bore 37. The flattened portion 84 also assists in holding the guide pilot 80 in place during drilling or tapping. The smooth inner bore 83 of the guide pilot 80 is designed to have a diameter just larger than a desired size drill bit 85 as shown in FIG. 10. The drill bit 85 should fit snugly in the smooth inner bore 83 of the guide pilot 80, as shown in FIGS. 16 and 17.

The drill bit 85 has a hole 86, FIGS. 10 and 12, at a preset length from the tip end thereof to receive a stop pin 87, shown in FIG. 11. The stop pin 87 is placed through the hole 86 and is held in hole 86 by spring loaded ball 88 projecting therefrom near one end thereof. A ring 89 near the opposite end thereof provides a stop for stop pin 87 to keep it in hole 86 and also provides a handle so that the stop pin may be easily inserted or removed from hole 86. Ball 88 retracts into pin 87 against its outward spring bias to allow insertion and removal of stop pin 87. The stop pin 87 interacts with the guide pilot 80 to prevent drill bit 85 from extending to far into cylinder 45 to thereby prevent damage to the piston. A hex shaft 90 extends from drill bit 85 to fit into a socket of an air wrench angle drive, a hand operated socket wrench, or other power source.

FIGS. 13, 14, and 15 shows a special tap holder 95 and a tap bit 96. The tap bit 96 is fastened to the tap holder 95 by a set screw 97. Like the drill bit, the tap holder 95 has a hole 98 through which the stop pin 87 is placed to ensure that the tap bit 96 does not enter the cylinder too deeply. A hex shaft 99 extends from tap holder 95 to fit into a socket of an air wrench angle drive, a hand operated socket wrench, or other power source.

FIG. 16 shows the set up to drill out damaged threads 100 in bore 101 forming the original lower threaded portion 39 and original lower non-threaded portion 41 of spark plug bore 37 with the drill bit 85 using the guide pilot 80. The lower portion 81 of the guide pilot 80 is slid into the upper portion 38 of the spark plug bore 37. There is no need to remove the cylinder head 30 from the engine block 31 or the exhaust manifold 33 or valve cover 35. The flattened portion 84 of the upper portion 82 of the guide pilot 80 interacts with the immediately adjacent portion 92 of cylinder head 30 to prevent the guide pilot 80 from rotating during drilling and ensuring proper alignment in the spark plug bore 37. Drill bit 85 with stop pin 87 is inserted into guide pilot 80 either before or after guide pilot 80 is positioned in spark plug bore 37. Once in place as shown in FIG. 16, drill bit 85 is allowed to move downwardly to rest on bore seat 40 and a drive means is coupled to hex shaft 90 to rotate drill bit 85. The drive means can be anything to impart rotation the drill bit 85. Generally a right angle air ratchet or air wrench is used, although a manually operated socket wrench can be used. With the Ford engines previously mentioned with which the invention is designed to be used, it will be necessary to use a right angle drive means to fit into the engine compartment of the vehicle.

FIG. 17 shows the position of drill bit 85 at the completion of drilling. A right angle air ratchet 102 is coupled to the hex shaft 90 with the appropriate sized socket 103. It is recommended to use a lubricant on the drill bit 85 during drilling. Stop pin 87 prevents drill bit 85 from entering cylinder 45 too deeply when it hits the top of the top of guide pilot 80 as shown. The drilling step should completely remove the threads 100 and in doing so enlarges bore 101. The drilling step can be accomplished in one step using a drill bit of the desired final size of the bottom of the bore before tapping, or can be divided into two steps, using a smaller drill bit first to partially enlarge the existing hole 101 and then a larger drill bit to finish drilling the hole to the desired size prior to tapping. The final size drilled hole is shown as 104 in FIG. 18.

Whether one or two steps are used in drilling hole 104 will generally depend upon the drive means used for the drill bit. It is easier to drill an immediate size hole and then the final hole so if the drilling is being done with a manual socket wrench or weakly powered drive, two steps should be used. If a sufficiently powerful drive means is used, it can be done in one step. If a two step process is used, a separate guide pilot is used for each different size drill to ensure proper alignment of the drill bit during drilling. First the guide pilot for the smaller drill bit is positioned as shown in FIG. 16 and drilling of the smaller hole is completed as shown in FIG. 17. The drill bit and guide pilot are removed from the bore.

Then the guide pilot for the larger drill bit is positioned as shown in FIG. 16, and the larger hole is drilled. The larger drill bit and guide pilot is removed from the bore. The only difference in the drill pilots for the two sizes of drill bits is the diameter of the smooth inner bore 83. The outer diameters of the guide pilots are the same.

Once the desired size hole 104 has been drilled, the hole is tapped. FIG. 18 shows the set up for tapping hole 104 drilled as described in the lower portion of spark plug bore 37. The same guide pilot as used for the final size drill bit will normally be used to guide the tap. Because the tap 96 is slightly larger than the final size drill and the smooth inner bore 83 of the guide pilot 80, the tap will not be able to slide through the guide pilot 80. This requires that the tap holder 95, which is the same diameter as the final drill bit used, with the stop pin 87 removed, be slid up through the bottom of the guide pilot 80. Stop pin 87 is then secured through hole 98. The tap 96, tap holder 95, and guide pilot 80 are then inserted into spark plug bore 37 to the position shown in FIG. 18. The flattened portion 84 of the guide pilot 80 is aligned against the cylinder head portion 92 in the same manner as when drilling out the damaged threads 100. At this point, the guide pilot 80 may rest in a position as shown in FIG. 18 slightly extended out of the spark plug bore 37. While use of the same guide pilot as used for the final drill bit, as described, is presently preferred, a different guide pilot sized for the particular tap could be used.

FIG. 19 shows the position of tap 96 at the completion of tapping. A right angle air ratchet 102 is coupled to the hex shaft 99 with the appropriate sized socket 103. It is recommended to use a lubricant on the tap 96 during tapping. Stop pin 87 prevents tap 96 from entering cylinder 45 too deeply and stops the tap at the appropriate depth into the cylinder 45 when it hits the top of the top of guide pilot 80 as shown. The tap 96 is then reversed to back it out of the taped hole. When backed out, tap 96 will be in the position shown in FIG. 18. The tap and guide pilot will then be removed. This leaves the spark plug bore 37 with a tapped, enlarged lower portion bore 105, FIG. 21, with threads 106. Lower portion bore 105 is threaded through its entire length.

After the drilling and tapping are complete, the cylinder is vacuumed out to remove the metal shavings that result from the drilling and tapping steps. Preferably, a fluid, such as carburetor cleaner, is squirted into the hole to make it easier to get the shavings out and the shavings are sucked out using a vacuum hose, such as a plastic gas hose or line attached to a vacuum source. If desired, a small visual scope can be used to inspect the cylinder to make sure that all debris has been removed.

FIGS. 20, 21, and 22 show the final installation steps and completion of the thread insert and spark plug installation. A replacement spark plug 42, FIG. 20, which is a tapered seat spark plug as originally used in the engine (original equipment spark plug), and as used in the remaining undamaged spark plug bores, is threaded into a thread insert 60 of the invention. A bonding agent 108 is applied to the exterior threads 62 of the thread insert 60. The presently preferred bonding agent 108 is an epoxy capable of bonding metal to metal, such as J-B Kwik Weld manufactured by J-B Weld Co. of Sulphur Springs, Tex. which is a quick set epoxy steel resin glue. With the use of a standard spark plug socket 109, FIG. 21, attached in normal fashion to a manually operated socket wrench, not shown, the thread insert 60 and spark plug 42 are installed as one by threading thread insert 60 into the newly tapped threads 106. It is preferable to tighten the thread insert 60 and spark plug 42 using twenty-five foot pounds of torque. This will tighten thread insert flange 61 against bore taper 40 as shown in FIG. 22. The bonding agent 108 will spread itself between the threads as the thread insert is tightened. The excess bonding agent 108 that is squeezed along the threads 62 and 106 of the insert and bore, respectively, as the thread insert 60 is threaded into the hole collects in the space formed between the spark plug bore and neck 63. The space formed by neck 63 collects the excess bonding agent so it does not squeeze out into the spark plug bore around flange 61. This is the purpose of neck 63. After the appropriate curing time, about thirty minutes with the J-B Kwik Weld, thread insert 60 is securely held in an air tight condition in bore 105. Spark plug 42 may be removed from thread insert 60, if desired. However, removal will general not be necessary until time for the next spark plug change.

Thread insert 60 is preferably made of a steel or steel alloy so provides stronger threads than provided by the aluminum. This means that over tightening will not strip the threads and cross threading will be more difficult to accomplish to ruin the threads. The thread insert is also securely held in the cylinder head with an increased number of threads and the epoxy or other bonding agent. A high pressure connection between the thread insert and the cylinder head is formed. Also, because the tapered surface of the original spark plug bore is reproduced in the thread insert, the replacement spark plug is tightened to ensure a high pressure seal. All of the specifications of the original spark plug bore are maintained as is the amount of spark plug extension into the cylinder so that full performance of the engine is maintained. This is done without replacing the cylinder head as is current practice, and is done much more easily than a head replacement and at much less expense.

The tools of the invention allow the easy and accurate drilling and tapping of the spark plug bore and the easy insertion of the thread insert. The flange on the insert ensures that the insert is properly positioned in the spark plug bore and the insert cannot be inserted too far into the cylinder. The flange also allows for easy insertion of the insert using only the spark plug and a normal spark plug wrench or socket. No special tool is needed to position the insert. The collar between the flange and the externally threaded portion of the insert provides a space to catch and collect any bonding agent that may escape around the threads as the insert is screwed into the bore. This prevents the bonding agent from globing into the spark plug bore in uncontrolled fashion. Further, it can add to the pressure seal formed between the insert and the cylinder head.

To summarize the steps of the method of the invention, the basic method includes the following steps: a) obtaining a thread insert according to claim 1; b) obtaining a guide pilot having an internal bore of a size to closely accept a desired size drill bit therethrough and having a lower portion sized to snugly fit into the upper portion of the spark plug bore to thereby align the guide pilot and internal bore in the spark plug bore; c) positioning the lower portion of the guide pilot in the upper portion of the spark plug bore to align the guide pilot with respect to the bore; d) obtaining a drill bit of desired size to fit in the internal bore of the guide pilot; e) placing the drill bit in the internal bore of the guide pilot; f) attaching a drive means to the drill bit to cause rotation of the drill bit; g) using the guide pilot and the drive means, drilling out the damaged spark plug bore below the guide pilot; h) removing the drill bit and the guide pilot from the bore; i) obtaining a tap of a size for producing threads to mate with threads of the exterior threaded shaft of the thread insert and having a portion to extend through the internal bore of the guide pilot; j) positioning the tap in the guide pilot; k) positioning the lower portion of the guide pilot with the tap extending therefrom in the upper portion of the spark plug bore to align the guide pilot with respect to the bore; l) attaching the drive means to the tap to cause rotation of the tap; m) using the guide pilot and drive means, tapping threads into the drilled out spark plug bore; n) installing a tapered seat spark plug into the thread-insert; o) applying bonding agent to the exterior threads of the thread-insert; and p) installing the thread insert and spark plug as a unit into the new bore using a spark plug wrench. The method may also include the additional step of: q) obtaining a guide pilot having an internal bore of a size to closely accept a desired size drill bit therethrough smaller than the drill bit needed to drill a hole for the tap and having a lower portion sized to snugly fit into the upper portion of the spark plug bore; r) positioning the lower portion of the guide pilot with the tap extending therefrom in the upper portion of the spark plug bore to align the guide pilot with respect to the bore; s) obtaining a drill bit of desired smaller size to fit in the internal bore of the guide pilot; t) attaching the drive means to the smaller size drill bit to cause rotation of the smaller size drill bit; u) using the guide pilot and drive means, drilling out the damaged spark plug bore below the guide pilot; and v) removing the guide pilot and drill bit from the bore. It should be realized that the order of some steps is not critical. For example, it does not matter whether a drill is inserted through the guide pilot before or after it is inserted into the spark plug bore or is removed before or after the guide pilot is removed from the spark plug bore. The only order that is critical is that the smaller hole, if the smaller hole is used, is drilled before the larger hole, that the holes are drilled before tapping the hole, and that the hole is tapped before inserting the thread insert.

The kit of tools of the invention will include at least one drill bit having a drive end adapted to connect to a driving means and having a stop receiver, such as a hole therethrough, to receive a stop pin or other stop means, a stop means such as a stop pin, a guide pilot, and a tap adapted to cooperate with the guide pilot and having a stop receiver to receive the stop means. In order to use the same guide pilot as used for the drill bit, the tap includes a tap portion and a tap holder or extension that fits through the guide hole in the guide pilot. However, a separate tap guide pilot can be used. The kit will preferably include the bonding agent such as tubes containing the two parts of two part epoxy, and may include a second drill bit and second guide pilot for use with the second drill bit. It is presently preferred to include the second drill bit and second guide pilot so that the repair may be made using manual socket wrenches or lower power air ratchet wrenches.

While various sizes and dimensions will be used as required for particular engines, examples of sizes and dimensions that have been found satisfactory for the engines mentioned will be provided. The original threaded portion of the spark plug bore will typically consist of eighteen mm threads to match the spark plug threads. These will also be provided as the inner threads in the insert to mate with the spark plug threads. The final size hole for the insert is drilled with an eleven sixteenth inch drill bit and tapped with a three quarter inch NF thread tap to provide three quarter inch NF threads in the cylinder head. If an intermediate size drill bit is used, a forty-one sixty-fourths drill bit has been found satisfactory. The exterior threads on the thread insert are three quarter inch NF threads. With the thread insert of FIGS. 3–5, an insert length from the bottom of the flange of 0.710 inch has been found to correctly position the bottom of the insert at the bottom of the spark plug bore and top of the cylinder. As indicated, the taper will be positioned in the insert to correctly position the spark plug for the particular engine with which the insert will be used.

Whereas this invention is here illustrated and described with specific reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

We claim:

1. A thread insert to replace a damaged tapered seat spark plug bore in a cylinder head comprising:
   an exterior threaded shaft extending from a top end to a distal end;
   a flange forming the top end;
   an inner bore having a threaded portion at the distal end to receive the threaded end of a tapered seat spark plug; and
   said inner bore having a taper contoured to receive the tapered seat spark plug and adapted to form an airtight seal with the tapered seat of a tapered seat spark plug.

2. A thread insert according to claim 1, wherein a recessed neck is interposed between the threads of the exterior threaded shaft and the flanged head.

3. A thread insert according to claim 2, wherein the flanged head includes a top surface and a chamferred lower surface, said chamferred lower surface being adjacent to the neck.

4. A thread insert according to claim 3, wherein the spark plug bore in which the insert is to be installed has a taper therein, and wherein the chamfer has an angle that complements the taper in the bore so that the chamferred surface will abut the taper in the bore.

5. A thread insert according to claim 4, wherein the neck is configured to form a chamber between itself, the flanged head, and the cylinder head when the insert is installed in the cylinder head.

6. A thread insert according to claim 5, wherein the chamber is sized to collect excess bonding agent that may be forced from between the threads when a bonding agent is used to bond the exterior threads of insert to threads in the head.

7. A thread insert according to claim 2, wherein the neck is configured to form a chamber between itself, the flanged head, and the cylinder head when the insert is installed in the cylinder head.

8. A thread insert according to claim 7, wherein the chamber is sized to collect excess bonding agent that may be forced from between the threads when a bonding agent is used to bond the exterior threads of insert to threads in the head.

9. A method for repairing a damaged tapered seat spark plug bore in an internal combustion engine wherein the bore has an upper portion extending from an access opening to a taper therein, comprising the steps of:
   a) obtaining a thread insert according to claim 1;
   b) obtaining a guide pilot having an internal bore of a size to closely accept a desired size drill bit therethrough and having a lower portion sized to snugly fit into the upper portion of the spark plug bore to thereby align the guide pilot and internal bore in the spark plug bore;
   c) positioning the lower portion of the guide pilot in the upper portion of the spark plug bore to align the guide pilot with respect to the bore;
   d) obtaining a drill bit of desired size to fit in the internal bore of the guide pilot;
   e) placing the drill bit in the internal bore of the guide pilot;
   f) attaching a drive means to the drill bit to cause rotation of the drill bit;
   g) using the guide pilot and the drive means, drilling out the damaged spark plug bore below the guide pilot;
   h) removing the drill bit and the guide pilot from the bore;
   i) obtaining a tap of a size for producing threads to mate with threads of the exterior threaded shaft of the thread insert and having a portion to extend through the internal bore of the guide pilot;
   j) positioning the tap in the guide pilot;
   k) positioning the lower portion of the guide pilot with the tap extending therefrom in the upper portion of the spark plug bore to align the guide pilot with respect to the bore;
   l) attaching the drive means to the tap to cause rotation of the tap;
   m) using the guide pilot and drive means, tapping threads into the drilled out spark plug bore;
   n) installing a tapered seat spark plug into the thread-insert;
   o) applying bonding agent to the exterior threads of the thread-insert; and
   p) installing the thread insert and spark plug as a unit into the new bore using a spark plug wrench.

10. A method according to claim 9, further comprising the step of tightening the thread insert and spark plug using approximately 25 foot pounds of torque.

11. A method for repairing a damaged tapered seat spark plug bore according to claim 9, wherein the guide pilot has an enlarged upper portion, the enlarged upper portion of the guide pilot extending above the spark plug bore when the lower portion is positioned in the spark plug bore, the enlarged upper portion cooperating with a portion of the engine to prevent the guide pilot from rotating in the spark plug bore.

12. A method for repairing a damaged tapered seat spark plug bore according to claim 9, additionally comprising the steps, to be performed between steps a and b, of:
   q) obtaining a guide pilot having an internal bore of a size to closely accept a desired size drill bit therethrough smaller than the drill bit needed to drill a hole for the tap and having a lower portion sized to snugly fit into the upper portion of the spark plug bore;
   r) positioning the lower portion of the guide pilot with the tap extending therefrom in the upper portion of the spark plug bore to align the guide pilot with respect to the bore;
   s) obtaining a drill bit of desired smaller size to fit in the internal bore of the guide pilot;
   t) attaching the drive means to the smaller size drill bit to cause rotation of the smaller size drill bit;
   u) using the guide pilot and drive means, drilling out the damaged spark plug bore below the guide pilot; and
   v) removing the guide pilot and drill bit from the bore.

13. A kit of tools for repairing a tapered spark plug bore where threads in the bore have been damaged, the repair being accomplished with a thread insert according to claim 1, and the spark plug bore having an upper portion extending from an access opening to a taper intermediate the bore, comprising:
   a guide pilot having an internal bore of a size to closely accept a desired size drill bit therethrough and having a lower portion sized to snugly fit into an upper portion of the spark plug bore to thereby align the guide pilot and internal bore in the spark plug bore;

a tap of a size for producing threads to mate with threads of the exterior threaded shaft of the thread insert and having a portion sized to extend through the internal bore of the guide pilot; and a drill bit of the desired size to fit through the internal bore of the guide pilot and drill a hole to be tapped by the tap.

14. A kit of tools for repairing a tapered spark plug bore according to claim 13, additionally including a second guide pilot having an internal bore of a size to closely accept a desired size drill bit therethrough smaller than the drill bit needed to drill a hole for the tap and having a lower portion sized to snugly fit into the upper portion of the spark plug bore; and a second drill bit, the second drill bit sized to fit through the internal bore of the second guide pilot.

15. A kit of tools for repairing a tapered spark plug bore according to claim 14, wherein the guide pilots each include an enlarged upper portion, the enlarged upper portion extending above the spark plug bore when the lower portion is positioned in the spark plug bore, the enlarged upper portion cooperating with a portion of the engine to prevent the guide pilot from rotating in the spark plug bore.

16. A kit of tools for repairing a tapered spark plug bore according to claim 15, additionally including a bonding agent.

17. A kit of tools for repairing a tapered spark plug bore according to claim 16, wherein the bonding agent is a two part epoxy and includes two containers, one for each part of the two part epoxy.

18. A kit of tools for repairing a tapered spark plug bore according to claim 13, wherein the guide pilots each include an enlarge upper portion, the enlarged upper portion extending above the spark plug bore when the lower portion is positioned in the spark plug bore, the enlarged upper portion cooperating with a portion of the engine to prevent the guide pilot from rotating in the spark plug bore.

19. A kit of tools for repairing a tapered spark plug bore according to claim 13, additionally including a bonding agent.

* * * * *